Aug. 14, 1945.   B. C. COONS   2,382,134
APPARATUS FOR DECLUSTERING FRUIT
Filed Nov. 1, 1940   6 Sheets-Sheet 5
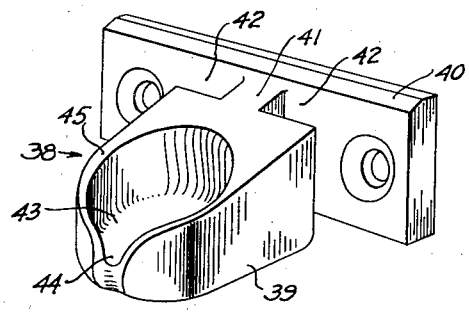
FIG_5_
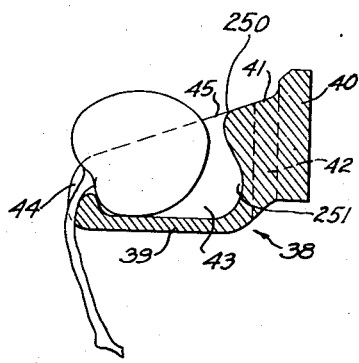
FIG_6_
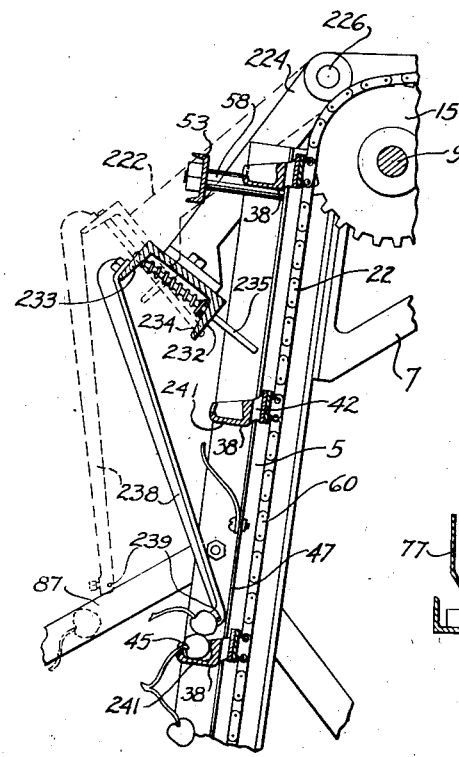
FIG_7_
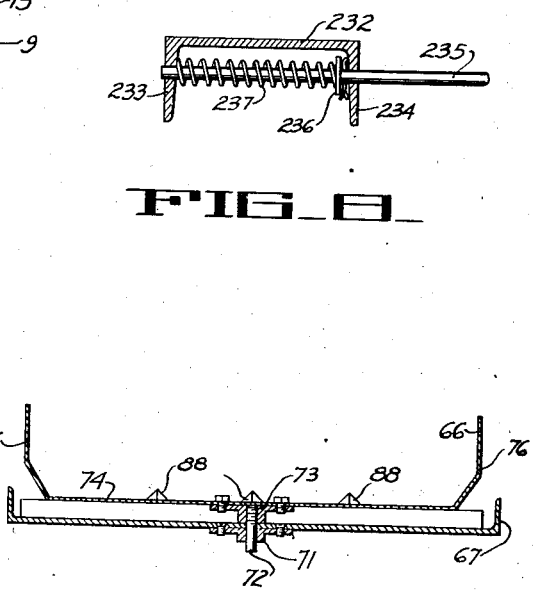
FIG_8_
FIG_9_
INVENTOR
BURTON C. COONS
BY
ATTORNEY Aug. 14, 1945.     B. C. COONS     2,382,134
APPARATUS FOR DECLUSTERING FRUIT
Filed Nov. 1, 1940     6 Sheets-Sheet 6

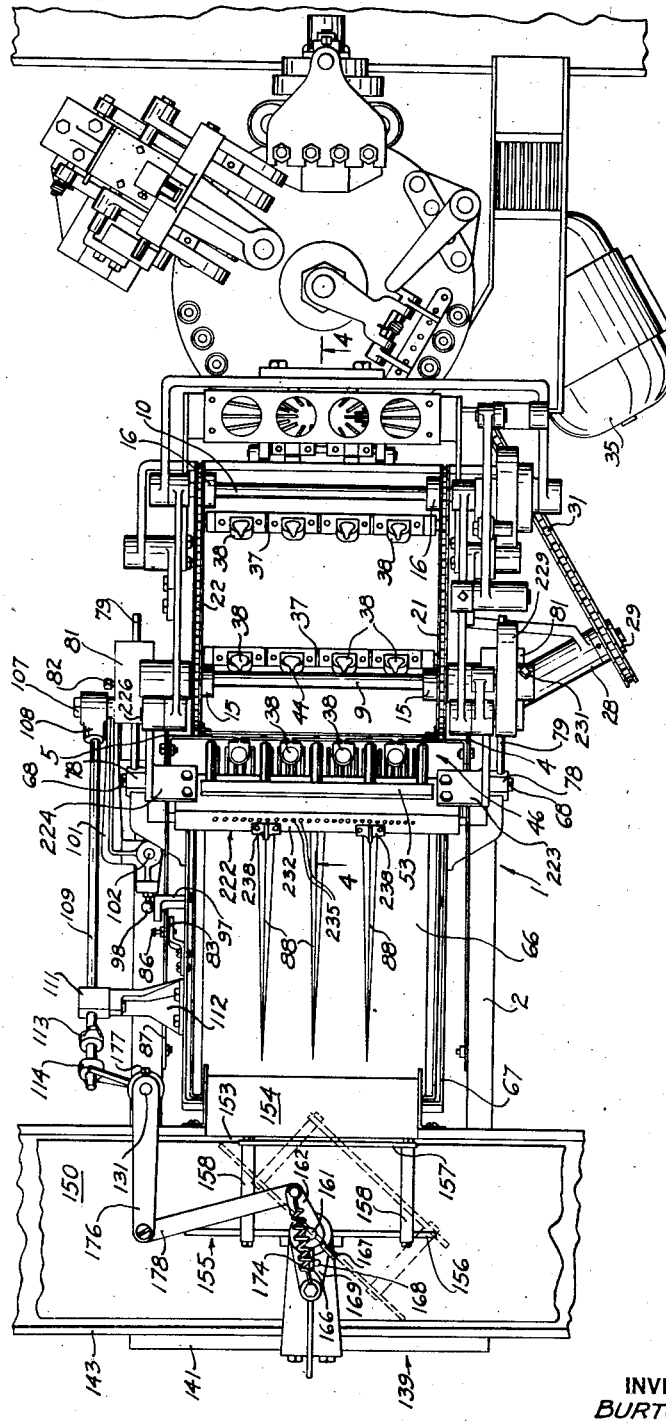

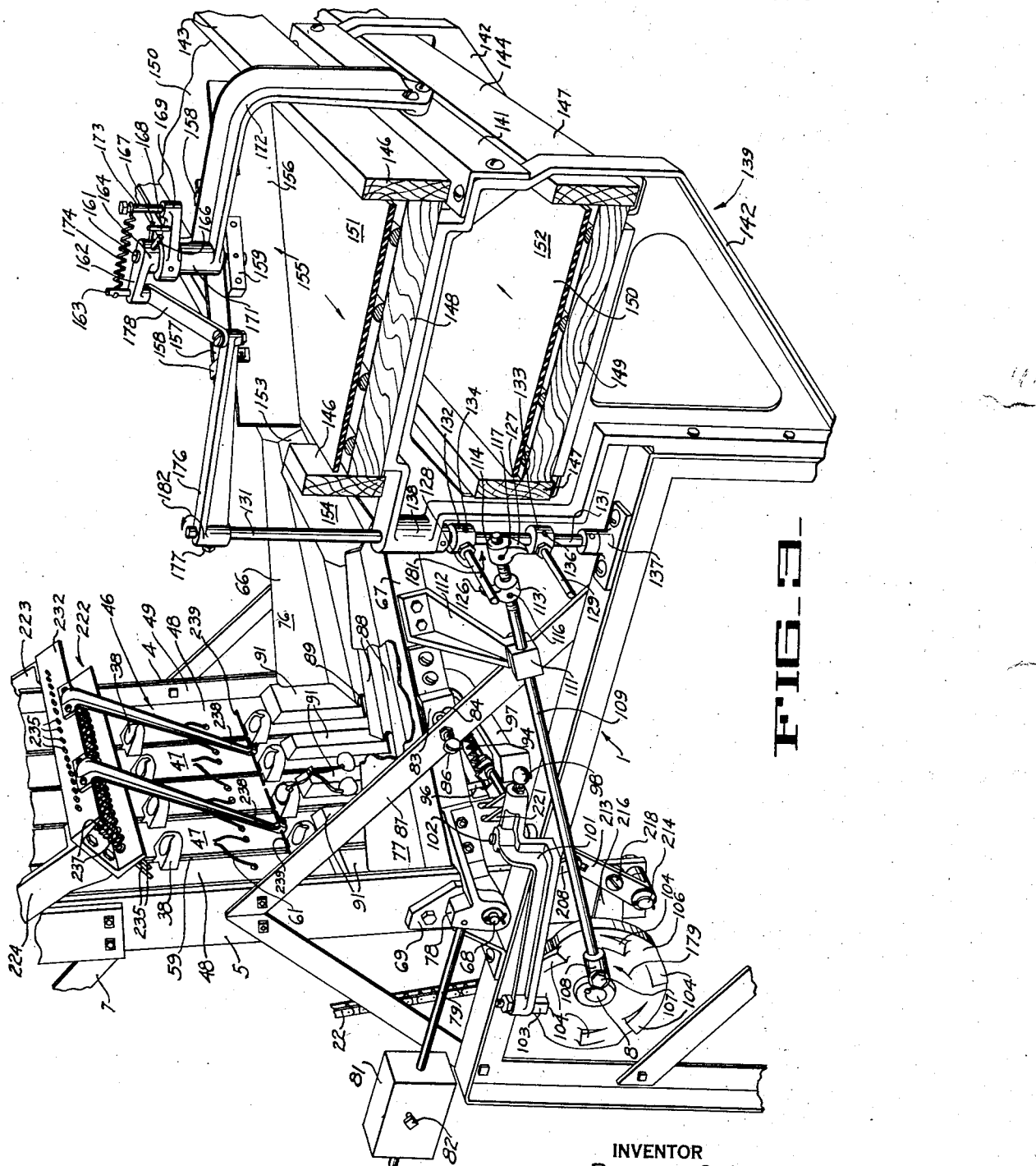

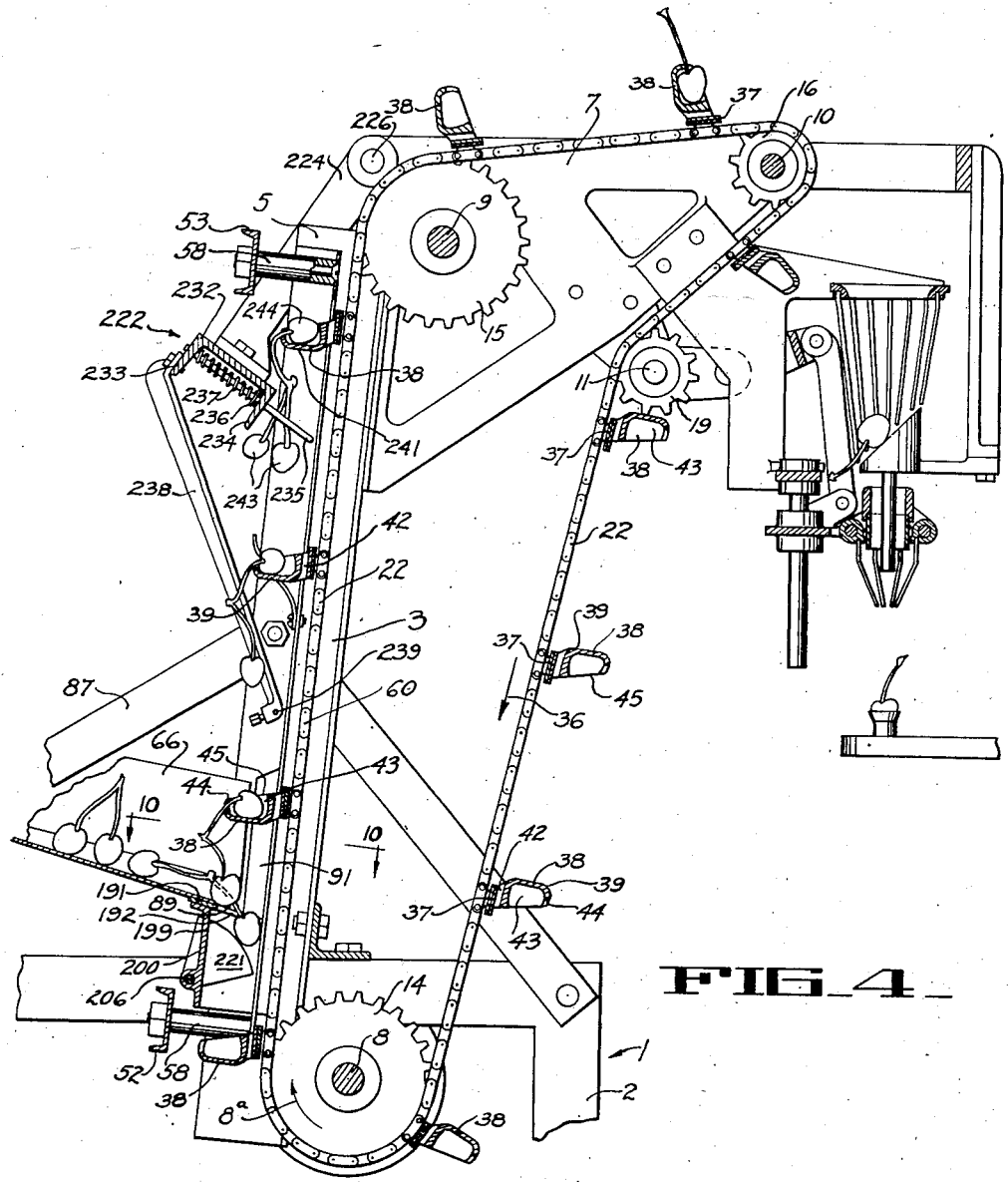

INVENTOR
BURTON C. COONS
BY Philip A. Minnis
ATTORNEY

Patented Aug. 14, 1945

2,382,134

UNITED STATES PATENT OFFICE 2,382,134

APPARATUS FOR DECLUSTERING FRUIT

Burton C. Coons, San Jose, Calif., assignor to Food Machinery Corporation, San Jose, Calif., a corporation of Delaware Application November 1, 1940, Serial No. 363,814

31 Claims. (Cl. 146—55)

The present invention relates to a method and apparatus for declustering cherries or the like preparatory to stemming, pitting, canning or any other treatment of the same.

Another object is to provide a machine for separating cherries joined by their stems in clusters into individual cherries without removing the stems thereof.

Another object is to provide a machine for declustering cherries to separate the stems of the individual cherries of each cluster of fruit.

Another object is to provide a machine for separating the individual cherries of a mixed mass of bunched and clustered fruit.

Another object is to provide a machine for declustering cherries which is of simple and inexpensive construction and efficient operation for separating clusters of cherries without stemming the individual cherries thereof.

Other and further objects and advantages of the present invention will become apparent from the following description taken in connection with the accompanying drawings, in which:

Fig. 2 is a plan view of Fig. 1.

Fig. 3 is a perspective view of a portion of the machine shown in Fig. 1.

Fig. 4 illustrates a longitudinal section of a portion of the machine, the view being taken along lines 4—4 of Fig. 2.

Fig. 5 is a perspective view of a fruit holding bucket.

Fig. 6 is a longitudinal section of the bucket of Fig. 5.

Fig. 7 shows a portion of Fig. 4, illustrating certain phases in the operation of the machine.

Fig. 8 is an enlarged cross section of the decluster bar.

Fig. 9 shows a transverse section of the feed hopper of the machine, the view being taken along lines 9—9 of Fig. 1.

Figure 1:
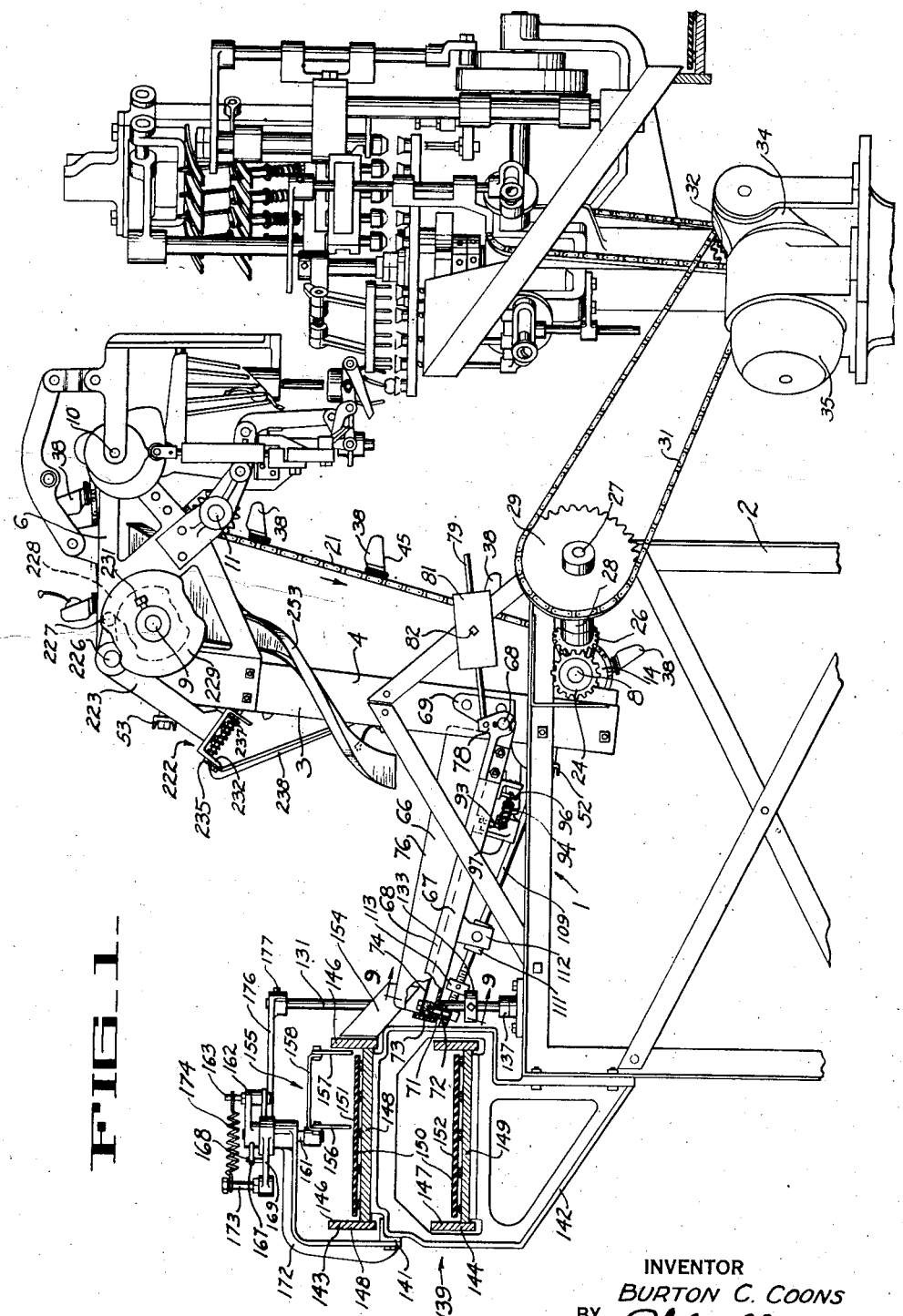
Fig. 1 is a side view of the machine of the present invention and a cherry pitting machine in connection with which it may be used.

Referring now to the drawings, and especially to Figs. 1, 2, and 3, 1 designates the frame structure of the machine which consists of a lower frame portion 2 and an upper frame portion 3. The upper frame portion 3 comprises spaced frame members 4 and 5 secured to the lower frame structure 2 in any convenient manner and arranged in substantially vertical position, as will be best seen from Figs. 1 and 3. Attached to the upper ends of the frame members 4 and 5 are horizontally extending frame members 6 and 7, respectively.

Figure 10:
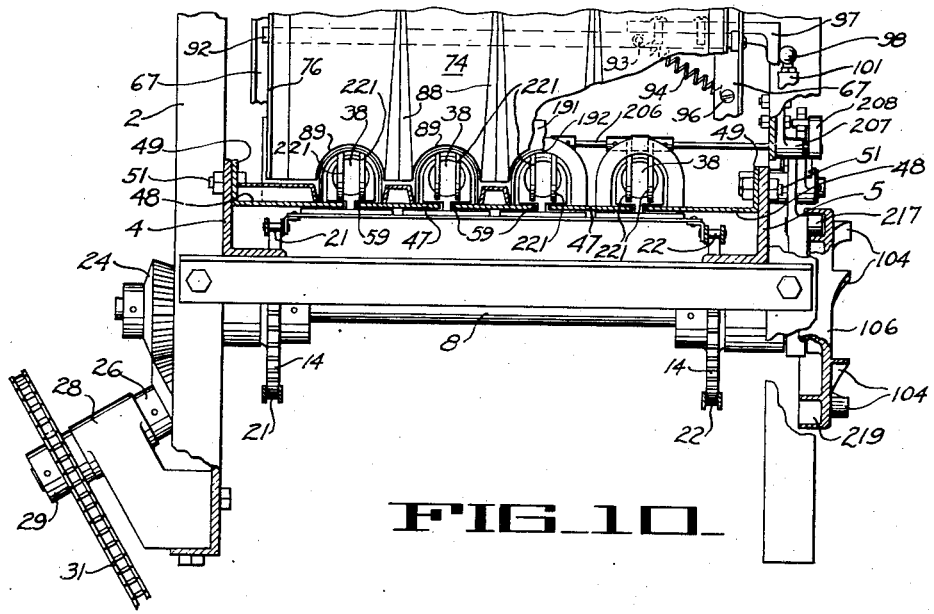
Fig. 10 is a section of Fig. 4 taken along lines 10—10 thereof.

Mounted within bearings on the frame structure 1 are transverse shafts 8, 9 and 10 and stud shafts 11. Each one of the transverse shafts 8, 9 and 10 carries a pair of sprocket wheels 14, 15, and 16, respectively. These sprocket wheels are keyed to their shafts for rotation therewith and are positioned within the frame structure 1 adjacent the sides of the same (see Figs. 2 and 10). The stud shafts 11 are provided with sprocket wheels 19 freely rotatable thereon and positioned in alignment with the sprocket wheels 14, 15 and 16 above referred to. Trained around the sprocket wheels 14, 15, 16 and 19 are endless sprocket chains 21 and 22.

One end of shaft 8 extends exterior of the frame structure of the machine and carries a bevel gear 24 fixed thereto which intermeshes with a bevel gear 26 keyed to a shaft 27 rotatably mounted within a bearing 28 on the lower frame structure 2 of the machine. The shaft 27 carries a sprocket wheel 29 keyed thereto which is driven by means of an endless sprocket chain 31 trained around sprocket wheel 29, and a sprocket wheel 32 of a variable speed control mechanism 34 operatively interconnected with a source of power, preferably an electric motor 35 (see Fig. 1). Upon operation of the motor 35, shaft 8 and sprocket wheels 14 are rotated in the direction as indicated by arrow 8a in Fig. 4, so as to cause a travel of the sprocket chains 21 and 22 around the sprocket wheels 14, 15, 16 and 19 in the direction of arrow 36.

Secured to the sprocket chains 21 and 22 are transverse bars 37, each provided with a plurality of fruit holding and supporting members 38 arranged in series and spaced with respect to each other (see Fig. 2). Each of these fruit holding and supporting members consists of a fruit receiving bucket 39 (see Fig. 5) provided with a flange 40, by which they are connected to the transverse bars 37 in any convenient manner, and a guide portion 41 interconnecting the flange with the fruit receiving bucket so that guide slots 42 are formed therebetween. The buckets 39 include a dished portion 43, a stem receiving recess 44, and an inclined rim surface 45.

Figure 12:
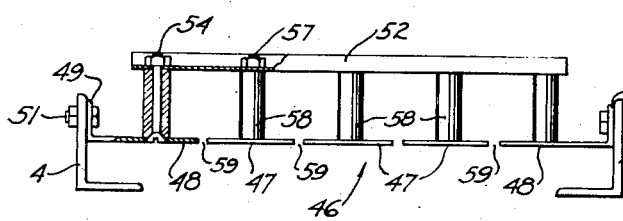
Fig. 12 is a detail view partially in section and partially in elevation of the guide plates and one of the spacer bars associated therewith.

Interposed between the frame members 4 and 5 and extending longitudinally thereof substantially over the entire length of the same is a bucket guide structure 46 (see Figs. 3, 10 and 12) which consists of parallel guide plates 47 and 48 arranged in spaced relationship with respect to each other. The guide plates 48, which are positioned adjacent the frame members 4 and 5, are provided with a flange 49 and are secured to the frame members 4 and 5 by means of bolts 51. These outer guide plates 48 carry spacer bars 52 and 53 secured thereto in spaced relation by means of bolts 54 and spacer sleeves 58 (see Fig. 12). The guide plates 47 are supported in spaced relation between the spacer bars 52 and 53 to which they are secured by means of bolts 57 and spacer sleeves 58 in a manner similar to guide plates 48.

The guide plates 48 and 47 form guide slots 59 therebetween and extend parallel to the portions 60 of the sprocket chains 21 and 22 between the sprocket wheels 14 and 15. The guide plates 48 and 47 are positioned within the path of travel of the fruit supporting members 38, so that the sides of the guide plates enter into the guide slots 42 of the members 38 and the guide portions 41 travel in the guide slots 59 between cooperating guide plates. The fruit receiving buckets 39 are therefore properly guided during their travel from a position adjacent the sprocket wheels 14 to a position adjacent the sprocket wheels 15 with the buckets positioned in front of the guide plates 47 and 48, and the flanges 40, transverse bars 37 and sprocket chains 21 and 22 travelling along the rear sides of said plates.

Figure 14:
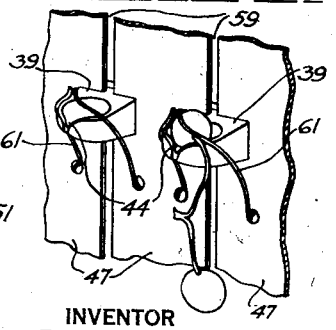
Fig. 14 is a perspective view of a portion of the machine showing the construction of the stem guides thereof.

Attached to the front of the guide plates 47 and 48 are flexible stem guides 61 arranged in pairs adjacent the guide slots 59 (see Figs. 3, 4, and 14). These stem guides extend in upward directions toward each other with the free ends thereof in closely spaced relation and in alignment with the stem receiving slots 44 of the buckets 39. The stem guides 61 are curved so as to permit the passage of the buckets 39 therebetween (see Fig. 14), and function to guide the stems of the fruits received within the buckets into the stem-receiving slots 44 to thereby arrange the fruit in predetermined positions.

In the present construction the transverse bars 37 are each provided with a row of four fruit supporting members 38; however, if desired, the machine may be provided with any other number of fruit supporting members than shown in the drawings, and the remaining structure of the machine may be correspondingly changed, as will be obvious to those versed in the art.

Positioned in front of the upper frame structure 3 above the lower frame 2 of the machine is a fruit receiving hopper 66 movably mounted within a hopper frame 67 pivotally supported by pivot studs 68 carried on brackets 69 secured to the frame members 4 and 5. The hopper frame 67 is of U-shaped configuration and provided with a bearing 71, at the front end of the same adapted to receive a pivot pin 72 fixed in a flange 73 secured to the bottom 74 at the front end of the hopper 66. The hopper 66 is of a chute-like construction and includes side walls 76 and 77 adjacent the bottom wall 74, as will be seen from Figs. 1 and 9.

The hopper frame 67 comprises further upwardly extending portions 78 adjacent the pivot studs 68, which carry rods 79 provided with counterweights 81. These counterweights are slidably mounted on the rods 79 and are locked in adjusted position thereon by means of set screws 82.

The hopper frame 67 is further provided with a bracket 83 fixed thereto having a slot 84 into which a set screw 86 extends, which is carried by a brace 87 positioned intermediate the upper and lower frame structure (see Fig. 3). The slot 84 is of such dimensions as to restrict the pivotal movement of the feed hopper 66 and feed hopper frame 67 within predetermined limits.

From the above it will therefore be noted that the hopper 66 and hopper frame 67 are freely movable around the pivot studs 68 and are normally held in their uppermost position by the counterweights 81, while the downward movement of the hopper 66 and frame 67 against the action of the counterweights 81 is effected by the weight of the cherries deposited in the hopper 66. By adjusting the position of the counterweights 81 with respect to the pivots 68, the weight of the fruit in the hopper 66 necessary to lower the chute may be varied.

The bottom wall of the chute is provided with longitudinally extending fins 88 forming longitudinally extending channels therebetween within which the fruit is guided toward openings 89 in the rear end of the bottom wall of the chute adjacent the guide plates 48 and 47. These openings are in alignment with the guide slots 59 previously referred to. Interposed between the guide plates 47 and 48 and the rear end of the hopper 66 are spacing bars 91 fixed to the guide plates and spaced with respect to each other to permit the passage of the fruit receiving buckets 39 therebetween.

Mounted on the bottom of the hopper 66 (see Fig. 10) is a transverse bar 92 provided with a downwardly extending pin 93 to which one end of a coil spring 94 is secured. The other end of said coil spring is attached to one side of the hopper frame 67 by means of a pin 96. Secured to the transverse bar 92 and extending outwardly from beneath the hopper frame 67 is an arm 97 which is engaged by a knob 98 of a bell crank 101 pivotally mounted at 102 upon the lower frame structure 2 and provided with a downwardly extending block 103 adapted to engage cam surfaces 104 of a vibrator cam 106.

The vibrator cam 106 is keyed upon the free end of the shaft 8 and carries a crank pin 107 pivotally received within crank bearing 108 of a pitman 109. The pitman 109 is slidably received within a universal bearing 111 carried by a bracket 112 secured to the hopper frame 67, and the free end of the pitman carries collars 113 and 114 threadedly secured thereon and locked in predetermined positions by means of set screws 116 and 117. The collars 113 and 114 are provided with upwardly extending lugs 126 and 127, respectively. The lugs 126 and 127 are adapted to engage pins 128 and 129, respectively, adjustably secured to a vertical shaft 131 by means of collars 132 and 133 and set screws 134 and 136 (see Fig. 3). The vertical shaft 131 is mounted within a bearing 137 secured to the lower frame structure 2 and a bearing 138 of a conveyor structure 139, which will now be described.

This conveyor structure 139 consists of a conveyor frame 141 extending transversely of the frame structure 1 and including supporting brackets 142 secured to the frame structure 1 of the machine. Mounted upon the supporting brackets 142 are upper and lower conveyor belt channels 143 and 144 comprising side walls 146 and 147, as well as bottom walls 148 and 149, respectively.

Mounted within the upper and lower conveyor channels 143 and 144 is an endless conveyor belt 150, only portions of which have been shown in Fig. 3, consisting of an upper and a lower run 151 and 152. The side wall of the upper conveyor belt channel 143 adjacent the front end of the hopper 66 is provided with an opening 153 and a discharge chute 154 which establishes communication between the belt channel 143 and the hopper 66.

Positioned above the upper run of the conveyor belt 151 adjacent the opening 153 is a shunt valve 155 consisting of a valve plate 156 and an auxiliary valve plate 157 secured thereto by means of brackets 158. These brackets hold the auxiliary plate 157 in spaced and parallel relation with respect to the valve plate 156. The auxiliary valve plate 157 is shorter than the valve plate 156 (see Fig. 2).

Fixed to the plate 156 by means of a bracket 159 is a crank shaft 161 provided with a crank arm 162 carrying a pin 163 at the free end thereof. This crank arm 162 comprises a hub portion 164 having radially extending stops 166 and 167 spaced with respect to each other. Positioned intermediate the stops 166 and 167 is a stop pin 168 mounted upon a horizontally extending arm 169 of a bearing 171 carried by a bracket 172 secured to the conveyor frame 141 in any convenient manner. The shaft 161 is rotatably mounted within the bearing portion 171 and the horizontally extending arm 169 of said bearing carries a vertical stud 173. A coil spring 174 secured with its free ends to the pin 163 and stud 173, respectively, is adapted to hold the crank arm 162 in one or the other of its extreme positions, as determined by the engagement of the stops 166 and 167 with the stop pin 168.

Fixed to the upper end of the shaft 131 is an arm 176 by means of a set screw 177. The free end of the arm 176 and the free end of the crank arm 162 are interconnected by means of a link 178 pivotally secured thereto.

From the above, it will therefore be seen that upon rotation of the shaft 8 and vibrator cam 106 in the direction as indicated by arrow 179 in Fig. 3 the cam surfaces 104 of the vibrator cam will be moved into and out of engagement with the block 103 and the bell crank 101 will be oscillated around its pivot 102, causing oscillation of the knob 98 in transverse directions and effecting oscillation of the arm 97 and hopper 66 around the pivot pin 72 against the tension of spring 94.

The rotation of the vibrator cam 106, as above referred to, causes further reciprocation of the pitman 109 within the universal bearing 111 and depending upon the position of the hopper 66 and hopper frame 67 the lug 126 or 127 will engage the pin 128 or 129, respectively. When the hopper 66 is empty and in its uppermost position, the lug 126 will engage the pin 128 upon rotation of the vibrator cam 106 and will shift said pin in a direction as indicated by arrow 181, causing rotation of shaft 131 in the direction of arrow 182 (see Fig. 3), so that the shunt valve 155 will be moved into charging position, as shown in Fig. 3. In this position the shunt valve 155 extends diagonally across the upper run of the conveyor belt 151 within the conveyor channel 143 and the fruit advanced by the upper run 151 of the conveyor belt from a source of supply toward said shunt valve will be directed by the same into the hopper 66 through the opening 153. Certain cherries will be guided by the valve plate 157 into the hopper 66 while others will be guided into the hopper by the plate 156, so that an even distribution of the cherries discharged from the conveyor belt 151 into the hopper 66 is obtained.

When a certain predetermined weight of cherries has been deposited into the hopper 66, the hopper pivots around its pivot pins 68 against the action of the counterweights 81 and effects a similar pivotal movement of the pitman 109 around the crank pin 107, so that the downwardly extending lug 126 is moved out of the path of the pin 128 and lug 127 is moved into the path of the pin 129. During the reciprocation of the pitman 109 lug 127 engages pin 129 and shaft 131 is thereby rotated in a direction opposite to that previously referred to. Due to the action of the arm 176 and link 178 shunt valve 155 is moved from its position in Fig. 3 to its full line position in Fig. 2 in which it is held by the action of the spring 174. The opening 153 of the conveyor belt channel 143 is thereby substantially closed and due to the position of the shunt valve 155 no further diversion of the fruit carried by the upper conveyor belt portion 151 into the hopper 66 is effected. The shunt valve 155 remains in this inoperative position until a sufficient amount of fruit have been removed from the hopper 66 so as to cause pivotal movement of the same in an upward direction under the influence of the counterweights 81 whereupon the operation of the shunt valve 155 repeats in the same manner as hereinabove described.

Figure 11:
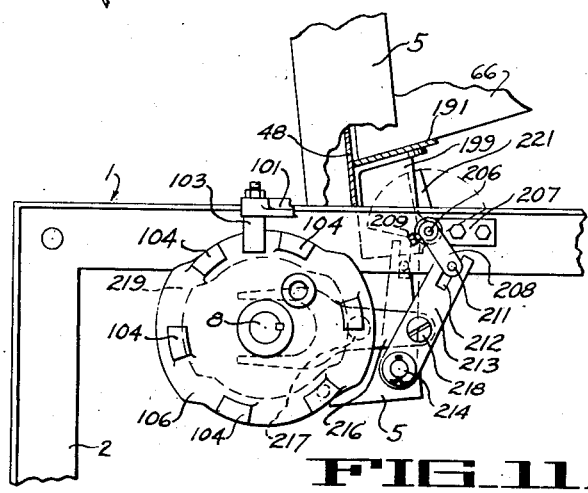
Fig. 11 illustrates a side view of a portion of the machine showing primarily the actuating mechanism for the control gates of the fruit receiving cups.
Figure 13:
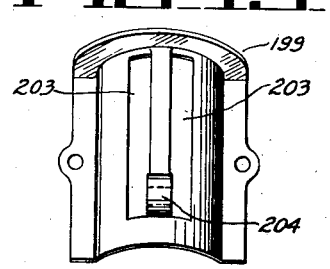
Fig. 13 is a perspective view of a fruit receiving cup.

Secured to the guide plates 46 and 47 below the rear end of the hopper 66 is a bearing plate 191 (see Fig. 4) provided with perforations 192 of the same size as openings 89. Positioned below the perforations of the bearing plate 191 and the fruit receiving openings 89 of the hopper 66 are fruit receiving cups 199 forming vertical passages 200 through which the buckets 39 are adapted to travel, upon operation of the sprocket chains 21 and 22 (see Fig. 4). Each of these fruit receiving cups, a detail of which is shown in Fig. 13, is provided with vertically extending slots 203 and a bearing 204 positioned therebetween. Rotatably mounted within the bearings 204 of each cup 199 is a transverse shaft 206, one end of which extends through a bearing 207 (see Fig. 11) carried by the lower frame structure 2 of the machine and is provided at its free end with an arm 208 fixed to said shaft by means of a set screw 209. The free end of the arm 208 carries a pin 211 slidably engaged within an elongated slot 212 of an actuating arm 213 pivotally mounted at 214 to the lower end of the frame member 5 of the machine. A yoke 216 straddling shaft 8 and comprising a cam roller 217 is pivotally secured to the arm 213 at 218 intermediate the pivot 214 and elongated slot 212 (see Fig. 11). The cam roller 217 engages a camway 219 of the vibrator cam 106 (see Fig. 10). Fixed upon the transverse shaft 206 and positioned within the slots 203 are control gate members 221 of segmental configuration (see Fig. 4). Upon rotation of shaft 8 and oscillator cam 106, roller 217 travels along the camway 219, and effects movement of the control gates 221 into and out of the vertical passages 200 of the fruit receiving cups 199. The configuration of the camway 219 is such that the control gates 221 are retracted from the passages 200 of the fruit receiving cups 199, while the fruit receiving buckets 39 pass through the same and return to their full line position as shown in Fig. 4 when the buckets 39 have passed the same.

It will therefore be seen that after the cherries have been discharged into the hopper 66 and while the same is oscillated in transverse directions the cherries deposited therein slide toward the fruit receiving openings 89 and drop one at a time into each of the fruit receiving cups 199 and upon the control gates 221 blocking the passage 200 within the same. The fruit receiving openings 89 and fruit receiving cups 199 are of such size as to receive one cherry at a time, without damaging the same during the vibration of the chute.

While the buckets 39 travel in an upward direction and pass through the passages 200 of the fruit receiving cups 199 the fruit positioned therein is received within the buckets 39 and is elevated thereby. If the cherries received within the buckets 39 are joined with their stems to the stems of other cherries and form clusters of fruit therewith, the entire cluster is elevated with the cherries not positioned within the buckets 39 hanging in a downward direction, as illustrated in Figs. 3 and 4.

While the buckets 39 pass the stem guides 61 the stems of the cherries received within the buckets are engaged by said guides and shifted along the inclined surfaces 45 of the buckets into the stem receiving recesses 44 thereof, so that the cherries are properly positioned thereby. In this manner the cherries are elevated from the hopper 66 and advanced past a decluster mechanism 222, now to be described.

This decluster mechanism 222 consists of bell crank 223 and arm 224 pivotally mounted by means of stud shafts 226 upon the horizontal frame structures 6 and 7 of the machine. One arm portion of the bell crank 223 carries a roller 227 which extends into the cam track 228 of a rotary cam 229 fixed to the shaft 9 previously referred to by means of a set screw 231. The other end of the bell crank 223 and the free end of arm 224 extend in downward directions and carry a decluster bar 232 transversely positioned with respect to the same.

This decluster bar 232 is of U-shaped configuration, as will be best seen from Figs. 3, 4, and 8, and includes parallel flanges 233 and 234 provided with openings within which fruit engaging fingers 235 are slidably received. These fingers are provided with collars 236 adjacent the flange 234, and coil springs 237 interposed between the flange 233 and collars 236 are adapted to maintain the fruit engaging fingers 235 in outwardly projected or operative positions. The fingers 235 are spaced with respect to each other but are in sufficiently close relationship to prevent the passage of a cherry therebetween. Secured to the decluster bar 232 are depending arms 238 provided at their free ends with strike-off wires 239 extending at right angles to the same and parallel to the guide plates 47 and 48.

Normally the decluster mechanism 222 is in a position as shown in Figs. 3 and 4, with the fruit engaging fingers 235 and strike-off wires 239 adjacent the guide plates 47 and 48. Upon rotation of shaft 8 and travel of the sprocket chains 21 and 22 in the direction of the arrow 36, as shown in Fig. 4, the series of fruit receiving buckets are successively moved past the strike-off wires 239 and the fruit engaging fingers 235. When the series of buckets designated 241 are adjacent the strike-off wires 239, as shown in full lines in Fig. 7, cam 229, cam track 228 and roller 227 effect a pivotal movement of the bell crank lever 223 and arm 224 around their pivots 226, so as to move the strike-off wires 239 out of the path of the baskets 241 from the full line to the dotted line position in Fig. 7. When only a single cherry is elevated by each bucket and has been properly received within the dished portion thereof, no operation is performed by the strike-off wires 239 upon the fruit. However, if two or more cherries are engaged and elevated by one or more of the buckets 241 the strike-off wires 239 engage and remove the additional fruit from the respective buckets and discharge the same back into the hopper 66. This assures that only a single cherry is received within each bucket and elevated by the same.

Upon further upward movement of the buckets 241 the declustering mechanism 222 is returned to its operative or full line position in Fig. 7, and as the next series of buckets approaches the strike-off wires 239 the declustering mechanism is again actuated and moved from its full to its dotted line position in Fig. 7, so that any additional cherries elevated by said series of buckets are discharged in the same manner as described in the above in regard to the series of buckets 241.

At this time the series of buckets 241 has passed the fruit engaging fingers 235 while they are in their dotted line position, and upon subsequent return of the declustering mechanism to operative position, as shown in Fig. 4, the fruit engaging fingers 235 in yoke fashion straddle the stems of the cherries 243 which are joined with the stems of the cherries 244 received within the series of buckets 241. I have discovered that clustered cherries are most easily separated by pulling the joined stems in opposite directions thereby tensely stretching the stems relative to each other until they are torn away from each other at their weakest point, that is, the point of union of their stems. In utilizing the physical characteristics of clustered cherries in this manner there is a positive assurance of the stems always separating at the point of union and not at the point of connection of the stems with the cherries because as will be noted in the drawings Fig. 4 the force is substantially directly aligned with the point of connection of the stems with their respective cherries, whereas the force exerted upon the point of union of the stems is lateral relative thereto. While the buckets 241 continue their upward travel the cherries 243 engage the fingers 235 and are held against further upward travel thereby so that the stems of the cherries 243 become taut and eventually are torn from the stems of the cherries 244 held in the buckets 241 at their point of union. The cherries 243 drop back into the hopper 66 when the decluster mechanism subsequently moves to inoperative position, while the cherries 244 are conveyed toward the sprocket wheels 10 and discharged from the buckets at this point. In this way the operation of the machine continues with respect to each series of buckets in the same manner as above described.

The operation of the decluster mechanism 222 is timed in such a manner that the fruit engaging fingers 235 move inwardly toward the guide plates 48 and 47 immediately after the buckets have passed the fingers 235, so that the latter will straddle the stems of the fruit in a manner as illustrated in Fig. 4. Normally the cherries of a cluster of fruit suspended on the stem of a single cherry received within one of the buckets 39 hang in a downward direction from said bucket in view of their own gravity; however, depending upon the union of the stems and their angular position with respect to each other, these cherries may arrange themselves in various positions and occasionally may be located within the path of the fruit engaging fingers 235 when the same move into operative position. To prevent crushing of the fruit in such instance the fingers 235 are slidably mounted within the decluster bar 232, as above mentioned, so that they may be shifted against the tension of the springs 237 back into the decluster bar. The tension of the springs 237 is very slight, so that the fingers 235 are freely retracted without damaging or impaling the fruit contacted thereby.

It has been previously mentioned herein that the cherries received within the buckets 39 are properly positioned therein by the action of the stem guides 61 which shift the stems of the cherries into the stem receiving recesses 44, so that during the declustering operation described above the fruits are firmly held within the buckets by the side walls thereof, as will be clearly seen from Fig. 4.

The dished portions 43 of the buckets 39, extend somewhat behind the upper rear edges 250 thereof, as shown at 251 in Fig. 6, so that while the fruit supporting members 38 travel around the sprocket wheels 15 and toward the sprocket wheels 16 (see Fig. 4) with the buckets 39 in substantially vertical positions, the blossom ends of the cherries positioned therein enter the portion 251 with the edges 250 engaging the sides of the fruit. These edges hold the cherries within the buckets and prevent their premature discharge from the same.

The cherries are discharged from the buckets while the same pass around the sprocket wheels 16 and drop into the feed mechanism of a cherry pitting machine or upon a conveyor which delivers the same from the machine for any other subsequent treatment thereof.

In case the strike-off wires should fail to remove any additional cherries elevated by the buckets 39, such additional fruit resting upon the buckets outside the fruit receiving recess of the same will be discharged, while the buckets travel around the sprocket wheels 15, into a return chute 253 positioned intermediate the procket wheels 15 and 16 and returned into the hopper 66.

*Operation*

In the following a résumé of the complete operation of the machine of the present invention will be given.

The cherries to be treated, which usually consist of a mixed mass of single cherries and clusters of cherries, are either manually supplied to the hopper 66 if the machine is used without a conveyor, or are delivered upon the upper run of the conveyor belt 150, if a feed conveyor of the type as shown herein is employed in conjunction with the machine.

The endless feed belt of this feed conveyor is continuously operated in a manner as well known in the art, and may be used for feeding the mixed mass of cherries to several declustering machines positioned adjacent the same.

Upon operation of the declustering machine, shaft 8 and sprocket wheels 14 are rotated, causing continuous travel of the sprocket chains 21, 22 and the series of fruit receiving members 38 supported thereby around the sprocket wheels 14, 15, 16 and 19 in the direction of arrow 36 in Fig. 4, and effecting rotation of shafts 9 and 10.

The rotation of shaft 8 causes rotation of the vibrator cam 106, oscillation of the bell crank lever 101, and reciprocation of the pitman 109. The oscillation of the bell crank 101 in conjunction with the action of the coil spring 94 causes oscillation of the hopper 66.

When the hopper is empty it is held in its uppermost position by the action of the counterweights 81. The lug 126 carried on the continuously reciprocating pitman 109 is in the path of the pin 128, and shaft 131 is rotated in the direction of arrow 182 (see Fig. 3). Rotation of the shaft 131 in the above-stated direction causes movement of the shunt valve 155 into operative position, and the cherries advanced by the upper run 151 of belt 150 toward the machine are directed into the hopper 66. When a predetermined amount of cherries has been delivered into hopper 66 the same moves downwardly under the weight of the fruit against the action of the counterweights 81 from the position shown in Fig. 3 to the position shown in Fig. 1. Lug 126 moves out of the path of pin 128 and lug 127 moves into the path of the pin 129, so that shaft 131 is now rotated in an opposite direction from that above referred to and the shunt valve 155 is moved to closed position (see Fig. 2).

This interrupts the flow of cherries from the conveyor into the hopper 66 until the weight of the cherries in the hopper is reduced and the latter moves again to its uppermost position, whereupon the cycle of operation of the shunt valve 155 repeats in the same manner as above described.

The cherries delivered into the hopper 66 slide downwardly along the inclined bottom wall thereof toward the opening 89 at the lower end of the same. The oscillation of the hopper 66 promotes the advancement of the cherries toward the openings 89 and the fins 88 guide the fruit in proper directions toward the same, so that the cherries, one at a time, enter into the openings 89 and passages 200 (see Fig. 4) wherein they are held adjacent the guide plates 47 and 48 by the control gates 221 in proper position within the paths of the buckets 39.

While the chains 21, 22 travel around the sprocket wheels 14, 15, 16 and 19, the buckets 39 secured to the chains travel therewith and pass through the passages 200 of the fruit receiving cups 199. When the buckets are below and adjacent the control gates 221 the same are rocked and retracted from the passages 200 of the cups 199 but are immediately returned to operative position after the buckets have passed the same.

This operation of the control gates 221 is effected by camway 219 of cam 106, roller 217, yoke 216, actuating arm 213, arm 208 and transverse shaft 206 in a manner as specifically explained hereinbefore.

While the control gates 221 are retracted the cherries released thereby are received within the buckets 39, only one cherry being permitted to enter into each dished or recessed portion 43 of each bucket 39. The upwardly moving buckets carry the cherries received therein from the hopper 66 past the strike-off wires 239, where any additional cherries supported upon the buckets are removed. Thereupon the cherries are advanced past the stem guides 61, which position the cherries in a predetermined manner within the cups, and finally past the fruit engaging fingers 235 of the declustering mechanism 222. The declustering mechanism 222, which also carries the strike-off wires 239, is operated in timed relation with respect to the travel of the buckets 39 by means of camway 228 of the cam 229, roller 227 and bell crank 223, so that the strike-off wires 239 and engaging fingers 235 are moved into inoperative position when the buckets 39 travel past the same and into operative position as soon as the buckets have passed the same.

If the fruit received within the cups 39 are single cherries with stems, no operations are performed upon the same by the fruit engaging fingers 235. However, if these cherries are joined with their stems to the stems of other cherries and form clusters with the same, the entire cluster of cherries is elevated with the fruit not received within the buckets 39 hanging downwardly below the same. In this way the cherries held within the buckets 39 and the remaining fruit of a cluster are spread apart so that the fruit engaging fingers 235 may enter into the space therebetween. While the single cherries of a cluster of fruit are held in this manner and are advanced past the declustering mechanism 222, the fruit engaging fingers move into operative position and straddle the stems of the downwardly hanging cherries which finally during their further upward travel engage the fingers 235 and are held thereby against further movement with the buckets 39, so that their stems are tautened and ultimately torn from the stems of the cherries within the buckets 39 at the point of union of the stems.

The separated single cherries with their stems thereon are subsequently advanced toward the sprocket wheels 16 where they are discharged from the buckets upon downward travel of the same.

The remaining cherries of a cluster of fruit which have been separated from the cherries in the buckets 39 by the fruit engaging fingers 235 are returned into the hopper 66 and are again advanced toward the openings 89 therein and subjected to another declustering operation until all cherries of a cluster of fruit are separated into single cherries.

If desired, the machine of the present invention may be used for feeding declustered or stemmed cherries to a cherry pitting machine or the like. In such case the declustering mechanism 222 may be preferably omitted so that the cherries are fed from the supply hopper 66 to the pitting machine by means of the conveyor mechanism comprising chains 21 and 22 and supporting members 38, whereby excess cherries carried by the fruit holding members 38 but not received within the pockets 43 thereof are discharged therefrom into the return chute 253 during the travel of the cups 39 in substantially vertical positions past the same. This return chute delivers the cherries discharged from the fruit holding means back into the supply hopper 66 in the same manner as previously stated herein.

While I have shown and described a preferred apparatus and a preferred method for carrying out my invention, it will be understood that both are capable of variation and modification, while still employing the principle of my invention. It is to be understood, therefore, that the scope of the invention should be limited only by the scope and proper interpretation of the claims appended thereto.

Having thus described my invention and in what manner the same may be used, what I claim as new and desire to protect by Letters Patent is:

1. A machine for separating cherries joined by their stems in a cluster, comprising means for moving a single cherry of said cluster in a predetermined path to cause the remaining cherries of the cluster to trail along, fruit engaging means associated with the moving means, means for moving the engaging means into the space between said single cherry and the remaining cherries, to engage the latter whereby to substantially align the stems of the remaining cherries with the stem of the single cherry and to separate said stems at their point of union.

2. A machine for separating cherries joined by their stems in a cluster comprising a movable support for carrying one cherry of said cluster and pendently supporting the other cherries of said cluster, and a cherry engaging yoke movably mounted adjacent the movable support for engaging another cherry of said cluster and for opposing movement of the same in the direction of said first-mentioned cherry to tauten the stems of said cherries into substantial alignment with respect to each other and to separate the stems of said cherries at their point of union.

3. A machine for declustering cherries joined by their stems comprising a conveyor provided with fruit holding means, fruit engaging means cooperating with said holding means, means for operating said conveyor for engaging a single fruit of a cluster and for moving the same and the remaining fruit of said cluster in one direction, and means for operating the fruit engaging means for engaging the remaining fruit of the cluster for arresting the movement thereof whereby the stem of the same is separated from the stem of the single fruit.

4. A machine for declustering cherries joined by their stems comprising a conveyor provided with fruit holding means, means for delivering the cherries to said conveyor, fruit engaging means cooperating with said fruit holding means, means for operating said conveyor for positioning a single cherry of a cluster within said holding means and for moving said single cherry and the remaining cherries of the cluster joined therewith in one direction, and means for operating the fruit engaging means for restraining the movement of the remaining cherries for parting the stems thereof from the stem of said single cherry.

5. A machine for declustering cherries joined by their stems comprising a conveyor provided with fruit holding means, means for delivering the cherries to said conveyor, fruit engaging means cooperating with said fruit holding means, means for operating said conveyor for positioning a single cherry of a cluster within said holding means and for moving said single cherry and the remaining cherries of the cluster joined therewith in one direction, means for controlling the positioning of said single cherry within the holding means, and means for operating the fruit engaging means for restraining the movement of the remaining cherries for parting the stems thereof from the stem of said single cherry.

6. A machine for declustering cherries joined by their stems in clusters comprising a conveyor, fruit receiving means on said conveyor, feed means associated with the conveyor for delivering cherries thereto, means for operating the conveyor for removing a cluster of cherries from the feed means by engaging a single cherry of said cluster and for moving said cluster in one direction, and means cooperating with said conveyor for restraining the movement of the other cherries of said cluster for parting the stems thereof from the stem of the single fruit.

7. A machine for declustering cherries joined by their stems in clusters comprising feeding means, a conveyor cooperating with said feeding means, means cooperating with the feeding means and conveyor for controlling the admission of clusters of cherries to said conveyor, means for operating the conveyor for engaging a single cherry of a cluster presented thereto by the feeding means for removing said cluster from the feeding means and for holding said single cherry spaced from the remaining cherries of said cluster, and means for restraining the movement of the remaining cherries for parting the stems thereof from the stem of the single cherry.

8. A machine for declustering cherries joined by their stems in clusters comprising feeding means, a conveyor having fruit receiving means cooperating with said feeding means, means cooperating with the feeding means and conveyor for controlling the admission of fruit into said fruit receiving means, means for operating the conveyor for engaging a single fruit of a cluster presented thereto by the feeding means for removing said cluster from the feeding means and for holding said single fruit spaced from the remaining fruit of said cluster, and means for restraining the movement of the remaining fruit for parting the stem thereof from the stem of the single fruit.

9. A machine for declustering cherries joined by their stems in clusters comprising a hopper, means for elevating clusters of cherries from said hopper with one cherry of each cluster spaced from the remaining cherries thereof, and means movable relative to said elevating means and engageable with the remaining cherries for restraining the movement of said remaining cherries for parting their stems from the stem of the cherry spaced therefrom.

10. A machine for separating cherries joined by their stems in a cluster comprising conveying means for moving the cluster of cherries in one direction with a single fruit of said cluster spaced from the remaining fruit thereof, means for feeding the cluster of cherries to said conveying means, and means for arresting the movement of said remaining fruit for parting the stem thereof from the stem of the single fruit.

11. A machine for separating cherries joined by their stems in a cluster comprising conveying means for moving the cluster of cherries in one direction with a single fruit of said cluster spaced from the remaining fruit thereof, means for feeding the cluster of fruit to said conveying means, means for controlling the admission of the fruit to said conveying means, and means for arresting the movement of said remaining fruit for parting the stem thereof from the stem of the single fruit.

12. A machine for separating cherries joined by their stems in clusters comprising a conveyor having fruit holding means for receiving a single fruit of each cluster, means for operating said conveyor for moving each single fruit received thereby in one direction, means for engaging the remaining fruit of each cluster for restraining the movement of the remaining fruit in said direction for parting the stem thereof from the stem of the single fruit, and means for operating the engaging means in timed relation with respect to said conveyor for maintaining the engaging means out of contact with said single fruit.

13. A machine for separating cherries joined by their stems in clusters comprising a hopper, a conveyor having fruit holding means, means interposed between said hopper and conveyor for positioning a single fruit of a cluster of cherries for engagement with said holding means, means for operating the conveyor for engaging the fruit holding means with said single fruit for lifting the same from the hopper with the remaining fruit of the cluster suspended thereon, and means relatively movable to said conveyor for engaging the suspended fruit for parting the stem thereof from the stem of the single fruit.

14. A machine for separating cherries joined by their stems in clusters comprising means for receiving a single fruit of a cluster of cherries and for holding it with the remaining fruit of the cluster suspended therefrom, means straddling the stem of the suspended fruit, and means for moving the receiving means and the single fruit held thereby away from said straddling means a sufficient distance to separate the stem of the suspended fruit from the stem of the single fruit at their point of union.

15. A cherry declustering machine comprising a conveyor having fruit holding means, means for supplying fruit to said conveyor, means interposed between the supply means and conveyor for controlling the admission of the fruit into the holding means, means for operating the conveyor for moving the fruit holding means past said control means for receiving a single fruit of a cluster of cherries and for removing the same from the supply means with the remaining fruit of the cluster suspended therefrom, and means cooperating with the fruit holding means for separating the stem of the single fruit supported thereby from the stem of the remaining fruit.

16. A cherry declustering machine comprising a conveyor having fruit holding means, means for supplying clusters of cherries to said conveyor, means interposed between the supply means and conveyor for controlling the admission of the cherries into the holding means, means for operating the conveyor for moving the fruit holding means past said control means for receiving a single cherry of a cluster and for removing the same from the supply means with the remaining cherries of the cluster suspended therefrom, means for arranging the stems of the cherries of said cluster in predetermined position with respect to the fruit holding means, and means cooperating with the fruit holding means for separating the stem of the single cherry supported thereby from the stems of the remaining cherries.

17. A cherry declustering machine comprising a conveyor having fruit holding means, means for supplying fruit to said conveyor, means interposed between the supply means and conveyor for controlling the admission of the fruit into the holding means, means for operating the conveyor for moving the fruit holding means past said control means for receiving a single fruit of a cluster from the supply means and for moving the same in one direction with the remaining fruit of the cluster suspended therefrom, and means for engaging the remaining fruit for restraining the movement thereof in said direction whereby the stem of the remaining fruit is separated from the stem of the single fruit.

18. A cherry declustering machine comprising a conveyor having fruit holding means, means for supplying fruit to said conveyor, control means associated with said conveyor, means for operating said control means and conveyor in timed relation with respect to each other for admitting a single fruit of a cluster of cherries into the holding means and for moving said single fruit in one direction with the remaining fruit of the cluster suspended therefrom, and means engageable with the remaining fruit for restraining the movement thereof in said direction to thereby separate the stem of the single fruit from the stem of the remaining fruit.

19. A machine for separating cherries joined by their stems in a cluster comprising means for moving said cluster in one direction with a single fruit of the cluster spaced from the remaining fruit, and a plurality of closely spaced fingers movable into the path of the remaining fruit for straddling the stem thereof and for restraining the movement of the remaining fruit in said direction whereby the stem of the single fruit is separated from the stem of the remaining fruit.

20. A machine for separating cherries joined by their stems in a cluster comprising conveying means for moving the cluster of cherries in one direction with a single fruit of said cluster spaced from the remaining fruit thereof, means for feeding the cluster of fruit to said conveying means, means for controlling the admission of said single fruit to said conveying means, and a plurality of closely spaced fingers movable into the path of the remaining fruit and straddling the stem thereof for arresting the movement of said remaining fruit to thereby separate the stem of the same from the stem of the single fruit.

21. In a machine for declustering cherries, a pivotally mounted feed hopper declustering means for removing cherries from the feed hopper, supply means for delivering the cherries to said feed hopper, and means associated with the feed hopper and supply means for controlling the delivery of the cherries from the supply means to said hopper in response to the pivotal movement of the latter under the influence of the weight of the cherries therein as determined by the removal of cherries from said hopper by action of the declustering means.

22. In a machine for declustering cherries, a weighing hopper, a conveyor for removing cherries from the weighing hopper, supply means for delivering cherries to the weighing hopper, and control means for regulating the admission of the cherries to the weighing hopper in correspondence with the weighing operation of the same as affected by the removal of cherries therefrom by the conveyor.

23. In a machine for declustering cherries, a pivotally mounted weight operated feed hopper means associated with the feed hopper for declustering the cherries therein and for removing cherries therefrom, supply means for delivering the cherries to said feed hopper, and a control valve associated with the supply means and operatively connected to the feed hopper and the means for removing cherries therefrom for controlling delivery of the cherries to the feed hopper.

24. A feed mechanism for cherry declustering machines comprising a pivotally mounted feed hopper, a conveyor adjacent the same, a control valve associated with the conveyor for discharging fruit therefrom into the hopper, control means associated with the control valve, actuating means on said hopper selectively engageable with the control means, and means for operating the actuating means for effecting opening and closing of the control valve.

25. A cherry declustering machine comprising a conveyor having fruit holding means provided with an inclined fruit receiving surface, means for supplying clusters of cherries to said conveyor, means interposed between the supply means and conveyor for controlling the admission of the cherries into the holding means, means for operating the conveyor for moving the fruit holding means past said control means for receiving a single cherry of a cluster and for removing the same from the supply means with the remaining cherries of the cluster suspended therefrom, means cooperating with the inclined surface of the fruit receiving means for arranging the stems of the cherries of said cluster in predetermined position with respect to the fruit holding means, and means cooperating with the fruit holding means for separating the stem of the single cherry supported thereby from the stems of the remainig cherries.

26. A cherry declustering machine comprising a supply hopper, a conveyor having fruit holding means, means for moving the fruit holding means past said supply hopper for removing the cherries therefrom, means for declustering the cherries removed from said hopper, and strike-off means operatively associated with said moving means to sweep over said fruit holding means as they are advanced for returning excess cherries to the supply hopper.

27. A machine for declustering cherries joined by their stems, comprising a support for engaging one of the cherries, a conveyor associated with said support for moving the latter along a predetermined path with the remaining cherries trailing the cherry engaged by the support, and means intermittently movable toward and away from said conveyor for obstructing movement of said remaining cherries whereby the stems of the latter are torn from that of the cherry engaged by the support at their point of union.

28. A machine for separating cherries joined by their stems, comprising a conveyor having means for supporting a single cherry for moving the latter along a predetermined path with the remaining cherries of said cluster pendently supported therefrom, and means straddling the stem of the remaining fruit and engageable with the latter for restraining movement thereof along said predetermined path whereby to break the point of union of the stem of the remaining cherries with the single cherry to permit continued movement thereof along said path.

29. A machine for separating clusters of cherries comprising fruit engaging means, a fruit holder for holding one of the cherries of the cluster and for moving the cluster of cherries past said engaging means, and means for moving the engaging means into the path of the remaining cherries of said cluster after said one of the cherries has passed the engaging means and for obstructing movement of the remaining cherries of said cluster whereby to separate the stem of the cherry held by the holding means from the stems of the remaining cherries engaged by the engaging means at their point of union.

30. A machine for feeding cherries comprising a supply hopper, a conveyor having fruit holding means provided with fruit receiving pockets, means mounting said conveyor for travel substantially vertically through said hopper with each fruit receiving pocket open side up and for subsequent travel substantially horizontally with each fruit receiving pocket open side substantially vertical, means for operating said conveyor for moving the fruit holding means through a mass of cherries in said hopper to receive and remove cherries therefrom and for subsequently moving said fruit holding means substantially horizontally whereby cherries removed from the hopper by the fruit holding means but not received within the pockets thereof are discharged therefrom.

31. A machine for feeding fruit comprising a supply chute having an outlet opening at its lower end through which one fruit at a time can pass, a conveyor having fruit receiving means movable through said opening for receiving and removing the fruit therefrom, means associated with said chute and conveyor for normally supporting a single fruit in said opening, and means for withdrawing said supporting means from fruit supporting position as said fruit receiving means moves through said opening.

BURTON C. COONS.